United States Patent
Xiang

(10) Patent No.: US 9,713,079 B2
(45) Date of Patent: Jul. 18, 2017

(54) MOBILE TERMINAL AND METHOD FOR MOBILE TERMINAL TO SELECT NETWORK

(75) Inventor: Haitao Xiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 44 days.

(21) Appl. No.: 14/385,387

(22) PCT Filed: May 18, 2012

(86) PCT No.: PCT/CN2012/075739
§ 371 (c)(1),
(2), (4) Date: Oct. 20, 2014

(87) PCT Pub. No.: WO2013/139077
PCT Pub. Date: Sep. 26, 2013

(65) Prior Publication Data
US 2015/0072683 A1 Mar. 12, 2015

(30) Foreign Application Priority Data
Mar. 20, 2012 (CN) .......................... 2012 1 0074437

(51) Int. Cl.
H04W 48/18 (2009.01)
H04W 60/00 (2009.01)
(52) U.S. Cl.
CPC ........... *H04W 48/18* (2013.01); *H04W 60/00* (2013.01)
(58) Field of Classification Search
CPC ... H04W 48/18; H04W 52/045; H04W 60/00; H04W 72/10; H04W 72/048
See application file for complete search history.

(56) References Cited

U.S. PATENT DOCUMENTS 6,801,777 B2 * 10/2004 Rusch ................... H04W 48/18
455/450
7,697,935 B2 4/2010 Guyot
(Continued)

FOREIGN PATENT DOCUMENTS

CN 1838819 A 9/2006
CN 101061738 A 10/2007
(Continued)

OTHER PUBLICATIONS

International Search Report in international application No. PCT/CN2012/075739, mailed on Jan. 3, 2013.
(Continued)

*Primary Examiner* — Daniel Washburn
*Assistant Examiner* — Eboni Hughes
(74) *Attorney, Agent, or Firm* — Oppedahl Patent Law Firm LLC

(57) ABSTRACT

Disclosed is a method for a mobile terminal to select a network, including: acquiring shared network configuration information set in advance and determining, according to the shared network configuration information, whether a home network of a local SIM card is a shared network; when the home network of the local SIM card is a shared network, then selecting, from all shared networks, an optimal shared network and implementing a registration operation of the optimal shared network. Further disclosed accordingly is a mobile terminal. In the disclosure, after it is determined that a home network of a local SIM card is a shared network, by using the method of selecting from all shared networks an optimal shared network on which a register access operation is performed, a user of a mobile terminal is enabled to select and access the optimal shared network in a shared network environment in the case that the network side is not modified, thus the objective of balancing network loads can be (Continued)

achieved, thereby improving user experiences of the mobile terminal.

7 Claims, 5 Drawing Sheets

(56) References Cited

U.S. PATENT DOCUMENTS

| | | | |
|---|---|---|---|
| 8,565,766 B2* | 10/2013 | Scherzer | H04W 48/18 455/432.3 |
| 2005/0064889 A1 | 3/2005 | Haumont | |
| 2005/0213566 A1 | 9/2005 | Jutila | |
| 2006/0073831 A1 | 4/2006 | Guyot | |
| 2009/0047957 A1* | 2/2009 | Westerberg | H04W 36/14 455/436 |
| 2009/0215446 A1* | 8/2009 | Hapsari | H04W 48/18 455/432.1 |
| 2010/0195643 A1* | 8/2010 | Kodali | H04W 48/18 370/352 |
| 2011/0034170 A1 | 2/2011 | Zhong | |
| 2014/0057632 A1* | 2/2014 | Hole | H04W 36/30 455/436 |

FOREIGN PATENT DOCUMENTS

| | | |
|---|---|---|
| CN | 102026328 A | 4/2011 |
| EP | 2268085 A1 | 12/2010 |
| WO | 03058996 A1 | 7/2003 |

OTHER PUBLICATIONS

English Translation of the Written Opinion of the International Search Authority in international application No. PCT/CN2012/075739, mailed on Jan. 3, 2013.
3GPP system to Wireless Local Area Network (WLAN) interworking; System description, mailed on Mar. 29, 2011.
Supplementary European Search Report in European application No. 12872042.2, mailed on May 11, 2015.

* cited by examiner

MOBILE TERMINAL AND METHOD FOR MOBILE TERMINAL TO SELECT NETWORK

TECHNICAL FIELD

The disclosure relates to the technical field of wireless communications, and in particular to a mobile terminal and a method for the mobile terminal to select a network.

BACKGROUND

With the development of mobile communication techniques, a mainstream mobile communication network system performs a full range of network coverage in the form of a cellular network, and according to the 3rd Generation Partnership Project (3GPP) TS 23.122, an automatic mode of a mobile terminal after its power on will first select a RegisterePublic Land Mobile Network (RPLMN) which has been successfully registered. If there is no RPLMN in the mobile terminal or the RPLMN is unavailable, the mobile terminal will search for sequentially an appropriate Public Land Mobile Network (PLMN) according to the rules, i.e., firstly search for a Home Public Land Mobile Network (HPLMN) or an Equivalent Home PLMN (EHPLMN), then search for a user-controlled PLMN, and then search for an operator-controlled PLMN, and finally search for other PLMNs available. A home network is determined by an SIM card issued by an operator.

However, with the development of mobile communication techniques and intense competitions in the market, network mergers and network sharing between operators become more and more frequent, and network constructions are sped up. If there are two operators in a country, i.e., operator A having an incomplete network coverage, a weak network capability, or a heavy network load and operator B having a good network coverage, in order to meet market demand, operator A and operator B decide to sign a network resource sharing agreement so that in the case of a same roaming charge, a user is allowed to register preferentially on a network of operator B or register simultaneously on a network of operator A and a network of operator B. However, if a user terminal still searches for a network according to a current protocol, above objectives cannot be achieved.

For another example, in a country, operator A is strong and has a relatively large user base but a relatively heavy network load In order to expand its services and improve user experiences, operator A decides to purchage the network of operator B so as to achieve the objective of network resource sharing. Though operator A and operator B belong to the same country, they have different Mobile Network Codes (MNCs), therefore for a terminal user using an issued SIM card, he/she is not capable of registering on not only the network of operator A but also the network of operator B by using an existing network searching method in the case that network parameters of a network of operator B are not modified.

When the above two sides sign a network resource sharing agreement or one side acquires the other, in the case that the network side is not modified, a user of a terminal having a commercially-available and issued SIM card, completely according to an implementation method of an existing agreement, can only preferentially select a home network specified by his/her SIM card, i.e., an SIM card issued by operator A can only be preferentially registered on the network of operator A while an SIM card issued by operator B can only be preferentially registered on the network of operator B. This will result in a decrease in utilization rate of a network and cannot solve the problem of network loads, and it is difficult to implement network sharing and network merger, thus affecting user experiences; moreover, if network sharing is implemented by modifying parameters in network side, huge maintenance and repairing cost will be taken.

SUMMARY

The disclosure is intended to provide a mobile terminal and a method for the mobile terminal to select a network, without the network being modified, the mobile terminal can choose to access an optimal shared network in a shared network environment so as to balance network loads.

Embodiments of the disclosure provide a method for a mobile terminal to select a network, and the method includes the following steps:

shared network configuration information set in advance is acquired and it is determined, according to the shared network configuration information, whether a home network of a local SIM card is a shared network;

when the home network of the local SIM card is a shared network, then an optimal shared network is selected from all shared networks and a registration operation of the optimal shared network is implemented.

Preferably, the shared network configuration information includes: an identity (ID) of each shared network and network capability information of each shared network.

Preferably, the selecting from all shared networks an optimal shared network specifically includes:

it is determined whether a network capability of each shared network of all shared network is consistent with each other;

when not consistent with each other, then a shared network having a strongest network capability is selected from all shared networks as the optimal shared network.

Preferably, the shared network configuration information further includes a priority value of each shared network;

after it is determined whether a network capability of each shared network of all shared network is consistent with each other, the method further includes:

when it is determined that the network capability of each shared network of all shared networks is consistent with each other, then it is further determined whether the priority value of each shared network of all shared networks is consistent with each other;

when it is determined that the priority value corresponding to each shared network of all shared networks is consistent with each other, then one shared network is selected randomly from all shared networks as the optimal shared network;

when it is determined that the priority value corresponding to each shared network of all shared networks is not consistent with each other, then a shared network having a highest priority value is selected from all shared networks as the optimal shared network.

Preferably, after the implementing a registration operation of the optimal shared network, the method further includes:

it is determined whether a current network capability of the optimal shared network is consistent with network capability information of a corresponding shared network in the shared network configuration information;

when it is determined that the current network capability of the optimal shared network is not consistent with the network capability information of the corresponding shared network in the shared network configuration information, then the network capability information of the corresponding shared network in the shared network configuration information is updated so that it is consistent with the current network capability of the optimal shared network.

Another embodiment of the disclosure provides a mobile terminal, including a first determination module and a selection module, wherein the first determination module is configured to acquire shared network configuration information set in advance and determine, according to the shared network configuration information, whether a home network of a local SIM card is a shared network;

the selection module is configured to: when the home network of the local SIM card is a shared network, then select from all shared networks an optimal shared network and implementing a registration operation of the optimal shared network.

Preferably, the shared network configuration information includes: an ID of each shared network and network capability information of each shared network.

Preferably, the selection module is specifically configured to: determine whether a network capability of each shared network of all shared network is consistent with each other; and when it is determined that the network capability of each shared network of all shared networks is not consistent with each other, then select from all shared networks a shared network having a strongest network capability as the optimal shared network.

Preferably, the shared network configuration information further includes a priority value of each shared network;

the selection module is further configured to: when it is determined that the network capability of each shared network of all shared networks is consistent with each other, then further determine whether the priority value of each shared network of all shared networks is consistent with each other; when it is determined that the priority value corresponding to each shared network of all shared networks is consistent with each other, then select randomly from all shared networks one shared network as the optimal shared network; when it is determined that the priority value corresponding to each shared network of all shared networks is not consistent with each other, then select from all shared networks a shared network having a highest priority value as the optimal shared network.

Preferably, the mobile terminal further includes a second determination module and an updating module, wherein the second determination module is configured to determine whether a current network capability of the optimal shared network is consistent with network capability information of a corresponding shared network in the shared network configuration information;

the updating module is configured to: when it is determined that the current network capability of the optimal shared network is not consistent with the network capability information of the corresponding shared network in the shared network configuration information, then update the network capability information of the corresponding shared network in the shared network configuration information so that it is consistent with the current network capability of the optimal shared network.

In the mobile terminal and the method for the terminal to select a network provided by embodiments of the disclosure, after it is determined that a home network of a local SIM card is a shared network, by using the method of selecting from all shared networks an optimal shared network on which a register access operation is performed, a user of a mobile terminal is enabled to select and access the optimal shared network in a shared network environment in the case that the network side is not modified, thus the objective of balancing network loads can be achieved, thereby improving user experiences of the mobile terminal.

DETAILED DESCRIPTION

It should be understood that the specific embodiments are only used to interpret the disclosure instead of limiting the disclosure.

Figure 1:
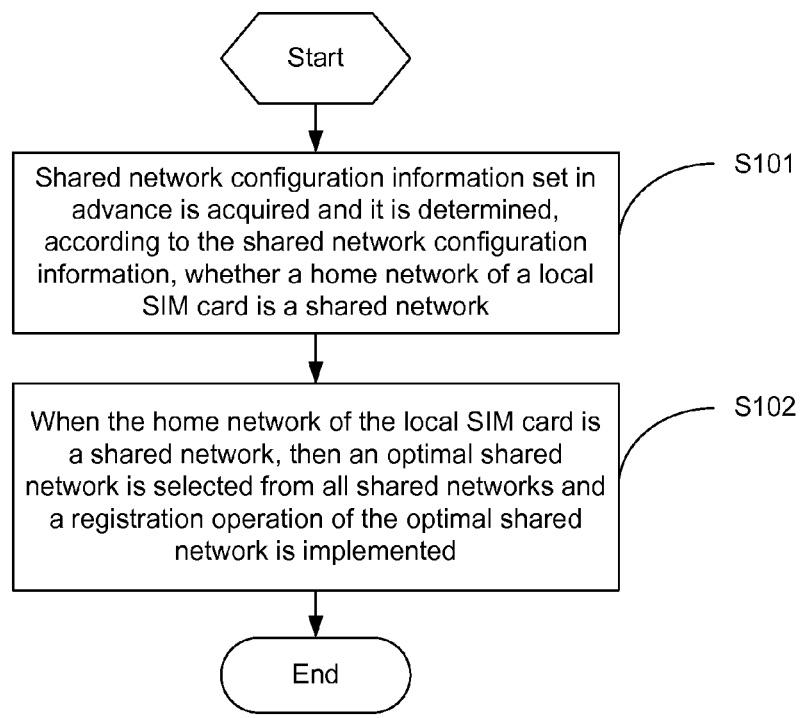
FIG. 1 is a flow chart of an embodiment of the method for a mobile terminal to select a network according to the disclosure.

Referring to FIG. 1, proposed is an embodiment of the method for a mobile terminal to select a network according to the disclosure, and the method includes:

step S101, shared network configuration information set in advance is acquired and it is determined, according to the shared network configuration information, whether a home network of a local SIM card is a shared network.

The shared network configuration information in this step can be set in advance in an encrypted file or an NV file before delivery of a mobile terminal. It can also be issued by a local SIM card or by the network side, then stored in a memory of the mobile terminal.

The home network of the local SIM card refers to a network of an operator to which the local SIM card belongs, and the PLMN ID of the home network consists of a Mobile Country Code (MCC) and a Mobile Network Code (MNC) of the home network of the local SIM card. Wherein the MCC and MNC are generally matched with a prefix of an International Mobile Subscriber Identification Number (IMSI) of the local SIM card.

In the step, the process of determining whether a home network of a local SIM card is a shared network includes: determining an MCC and MNC of the home network of the local SIM card according to an IMSI of the local SIM card; then searching whether the MCC and MNC of the home network of the local SIM card are recorded in a shared network list, if Yes, it indicates that the home network of the local SIM card is a shared network; otherwise, it indicates that the home network of the local SIM card is a non-shared network.

Further, the shared network configuration information includes: an identity (ID) of each shared network and network capability information of each shared network. The shared network configuration information can be in the form of a shared network list. Wherein, all shared networks listed in the shared network list belong to one operator or there is a corresponding network resource sharing agreement therebetween. The structure of the ID of the shared network is as shown in FIG. 1, and the ID consists of an MCC and an MNC of the shared network.

TABLE 1

| MCC | MNC |
|-----|-----|

The network capability of the shared network refers to the maximum capability which the shared network can support, such as a High Speed Downlink Packet Access (HSDPA), a High Speed Uplink Packet Access (HSUPA), HSPA+, DC-HSPA+, a Long Term Evolution (LTE), and the network capability of the shared network in the embodiment is indicated by an integer, wherein the greater the value of the integer is, the stronger the network capability is, and the higher the theoretical download rate it can support. For example, HSPA+ supports a maximum theoretical downlink rate of 28 Mbps while DC-HSPA+ supports a maximum theoretical downlink rate of 42 Mbps.

Step S102, when the home network of the local SIM card is a shared network, then an optimal shared network is selected from all shared networks and a registration operation of the optimal shared network is implemented.

The performing a registration operation of the optimal shared network in the step specifically includes: a non-access layer transmits an ID of a selected optimal shared network to an access layer, the access layer begins to sweep so as to look up, in each frequency band, cells matched with the optimal shared network, and acquires an MCC and MNC of the shared network through an encoded Broadcast Control Channel (BCCH) message, when an MCC and MNC of a cellular network are consistent with the ID of the optimal sharing network, cell residence in this cell is performed and then a registration process is performed; when in a location where the mobile terminal is located there is not a cellular network of which the MCC and MNC are consistent with the ID of the optimal sharing network, the access layer returns "Optimal shared network registration failed" or "No services information available".

Further, in the above embodiment, when the home network of the local SIM card doesn't belong to a shared network, the registration of the optimal shared network fails or there is no service information available in the optimal shared network, then the mobile terminal will re-select a network according to an existing normal protocol process. Wherein the existing normal protocol is 3GPP protocol, and the network re-selection process is as follows: trying to register according to a sequence of RPLMN→HPLMN/EHPLMN→user-controlled PLMN→operator-controlled PLMN. And according to available PLMNs reported by the access layer, the following steps are tried in sequence: cell selection, connection to an access network, frame synchronization, time slot synchronization, cell residence, and finally position record process and routing area record process are performed so as to acquire normal services.

Figure 2:
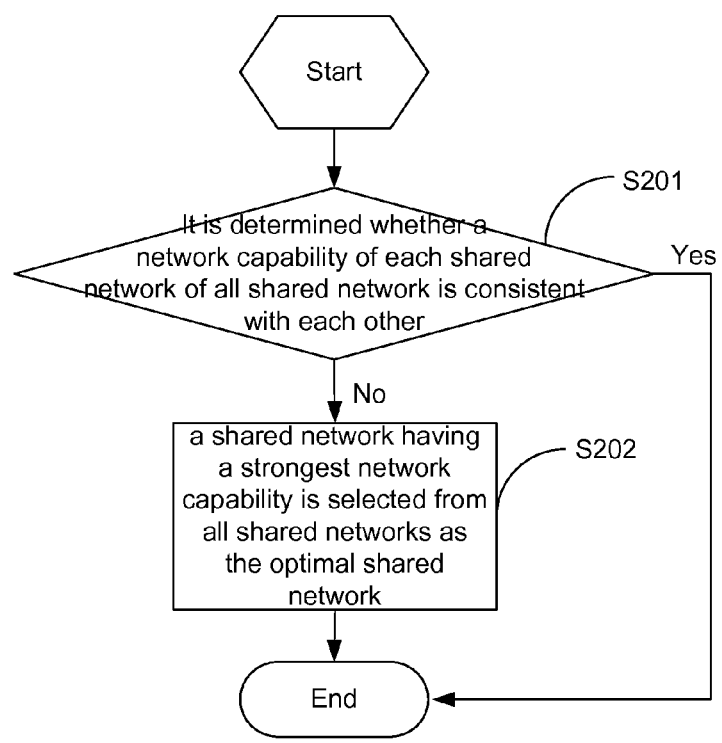
FIG. 2 is another flow chart of an embodiment of the method for a mobile terminal to select a network according to the disclosure.

Further, referring to FIG. 2, the selecting from all shared networks an optimal shared network in step S102 specifically includes:

step S201, it is determined whether a network capability of each shared network of all shared network is consistent with each other;

step S202, when it is determined that the network capability of each shared network of all shared networks is not consistent with each other, then a shared network having a strongest network capability is selected from all shared networks as the optimal shared network.

In step S202 according to the embodiment, a shared network having a strongest network capability can be searched and selected from all shared networks by using a searching method. Such a selection and registration of a shared network having a strongest network capability can improve the effect of experiences of network users and improving utilization ratio of the network.

Further, in the above embodiment of the method for a mobile terminal to select a network, the shared network configuration information further includes a priority value of each shared network.

Figure 3:
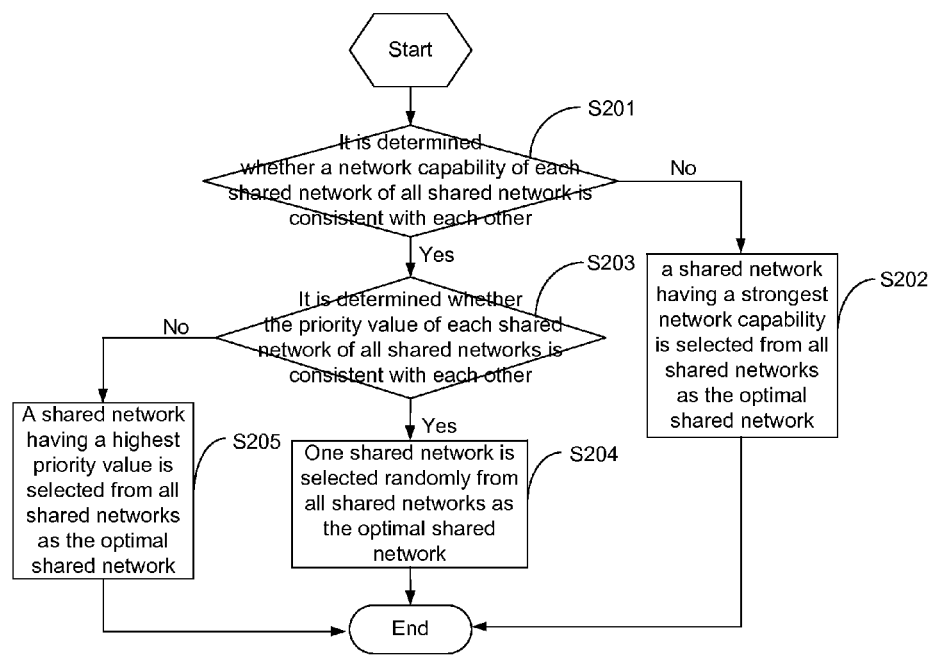
FIG. 3 is yet another flow chart of an embodiment of the method for a mobile terminal to select a network according to the disclosure.

Further, referring to FIG. 3, after above step S201, the method further includes:

step S203, when it is determined that the network capability of each shared network of all shared networks is consistent with each other, then it is determined whether the priority value of each shared network of all shared networks is consistent with each other; if consistent, proceed to step S204; if not consistent, proceed to step S205;

Step S204, one shared network is selected randomly from all shared networks as the optimal shared network.

In the step, the random selection method of selecting randomly from all shared networks one shared network can be an arbitrary selection, and it can also use a pseudo-random algorithm, wherein using a pseudo-random algorithm is intended to ensure even distribution of all network users when capabilities, utilization rates and coverages of all shared networks are equivalent.

Step S205, a shared network having a highest priority value is selected from all shared networks as the optimal shared network.

The priority value of the shared network is a impact factor used to measure the shared network when capabilities of all shared networks are equivalent but coverages and resource utilization rates of all shared networks are different. When capabilities of all shared networks are same but the priority values are different, the selection of a shared network having a highest priority value can play a part in balancing network loads.

Figure 4:
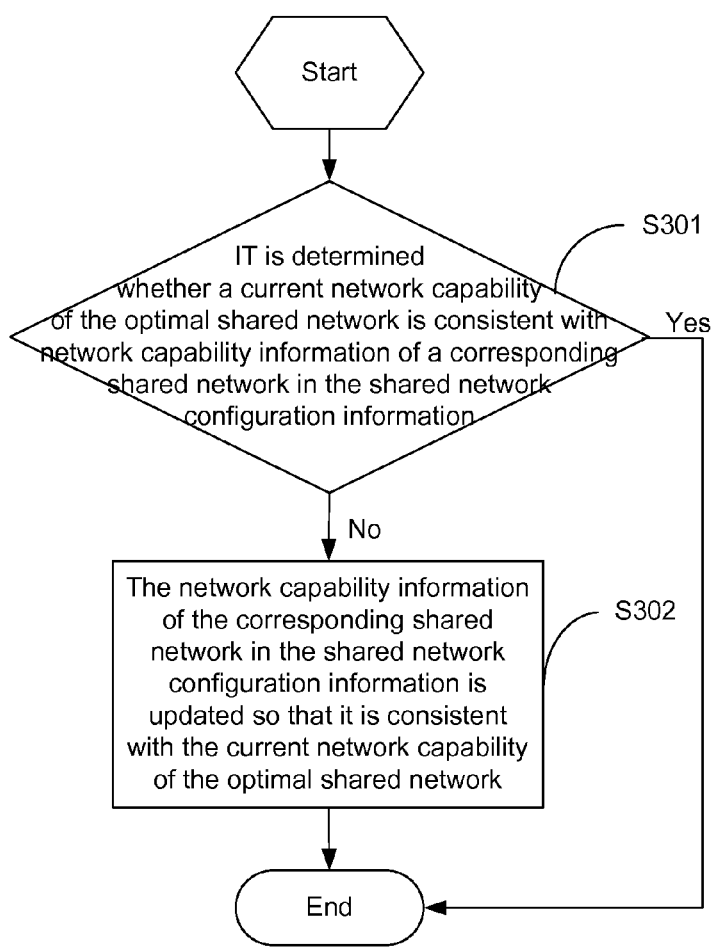
FIG. 4 is a flow chart of another embodiment of the method for a mobile terminal to select a network according to the disclosure.

Referring to FIG. 4, provided is yet another embodiment of the method for a mobile terminal to select a network according to the disclosure, and the embodiment further includes, after the performing a registration operation of the optimal shared network described in the above embodiment step S301, it is determined whether a current network capability of the optimal shared network is consistent with network capability information of a corresponding shared network in the shared network configuration information; if not consistent, proceed to step S302, otherwise end the process.

Step S302, the network capability information of the corresponding shared network in the shared network configuration information is updated so that it is consistent with the current network capability of the optimal shared network.

In the embodiment, the current network capability information of the optimal shared network is updated in the shared network configuration information so as to facilitate other mobile terminals to select a shared network.

In the embodiment of the above method for a mobile terminal to select a network, after it is determined that a home network of a local SIM card is a shared network, by using the method of selecting from all shared networks an optimal shared network on which a register access operation is performed, a user of a mobile terminal is enabled to select and access the optimal shared network in a shared network environment in the case that the network side is not modified, thus the objective of balancing network loads can be achieved, thereby improving user experiences of the mobile terminal.

Figure 5:
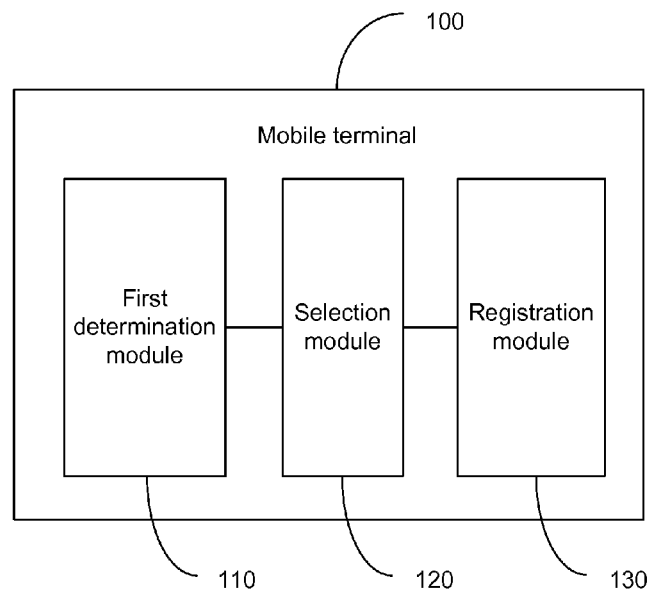
FIG. 5 is a schematic structural diagram of an embodiment of the mobile terminal according to the disclosure.

Referring to FIG. 5, provided is an embodiment of the mobile terminal 100 according to the disclosure, and the mobile terminal includes a first determination module 110, a selection module 120 and a registration module 130. The first determination module 110 is configured to acquire shared network configuration information set in advance and determine, according to the shared network configuration information, whether a home network of a local SIM card is a shared network. The selection module 120 is configured to when the home network of the local SIM card is a shared network, then select from all shared networks an optimal shared network; and the registration module 130 is configured to implement a registration operation of the optimal shared network.

The shared network configuration information in the embodiment can be set in advance in an encrypted file or an NV file before delivery of a mobile terminal. It can also be issued by a local SIM card or by the network side, then stored in a local memory of the mobile terminal.

The home network of the local SIM card refers to a network of an operator to which the local SIM card belongs, and the PLMN ID of the home network consists of an MCC and an MNC of the home network of the local SIM card. Wherein, the MCC and MNC are generally matched with a prefix of an IMSI of the local SIM card.

In the embodiment, the first selection module 100 is configured specifically to determine an MCC and MNC of the home network of the local SIM card according to an IMSI of the local SIM card; then search whether the MCC and MNC of the home network of the local SIM card are recorded in a shared network list, if Yes, it indicates that the home network of the local SIM card is a shared network; otherwise, it indicates that the home network of the local SIM card is a non-shared network.

In the embodiment, the registration module 130 is specifically configured to: call a non-access layer to transmit an ID of a selected optimal shared network to an access layer, then call the access layer to begin to sweep so as to look up, in each frequency band, cells matched with the optimal shared network, and acquire an MCC and MNC of the shared network through an BCCH message, when an MCC and MNC of a cellular network are consistent with the ID of the optimal sharing network, perform cell residence in this cell and then perform a registration process; when in a location where the mobile terminal is located there is not a cellular network of which the MCC and MNC are consistent with the ID of the optimal sharing network, call the access layer to return "Optimal shared network registration failed" or "No services information available".

Further, in the above embodiment, when the home network of the local SIM card doesn't belong to a shared network, the registration of the optimal shared network fails or there is no service information available in the optimal shared network, then the registration module 130 will re-select a network according to an existing normal protocol process. Wherein the existing normal protocol is 3GPP protocol, and the network re-selection process is as follows: trying to register according to a sequence of RPLMN→HPLMN/EHPLMN→user-controlled PLMN→operator-controlled PLMN. And according to available PLMNs reported by the access layer, the following steps are tried in sequence: cell selection, connection to an access network, frame synchronization, time slot synchronization, cell residence, and finally position record process and routing area record process are performed so as to acquire normal services.

Further, in the above embodiment, the shared network configuration information includes: an ID of each shared network and network capability information of each shared network.

The shared network configuration information can be in the form of a shared network list. Wherein, all shared networks listed in the shared network list belong to one operator or there is a corresponding network resource sharing agreement therebetween. The structure of the ID of the shared network is as shown in FIG. 1, and the ID consists of an MCC and an MNC of the shared network.

The network capability of the shared network refers to the maximum capability which the shared network can support, such as HSDPA, HSUPA, HSPA+, DC-HSPA+, LTE, and the network capability of the shared network in the embodiment is indicated by an integer, wherein the greater the value of the integer is, the stronger the network capability is, and the higher the theoretical download rate it can support. For example, HSPA+ supports a maximum theoretical downlink rate of 28 Mbps while DC-HSPA+ supports a maximum theoretical downlink rate of 42 Mbps.

Further, in the above embodiment, the selection module 120 is specifically configured to: determine whether a network capability of each shared network of all shared network is consistent with each other; and when it is determined that the network capability of each shared network of all shared networks is not consistent with each other, then select from all shared networks a shared network having a strongest network capability as the optimal shared network. The selection module 120 according to the embodiment can search and select from all shared networks a shared network having a strongest network capability by using a searching method. Such a selection and registration of a shared network having a strongest network capability can improve the effect of experiences of network users and improving utilization ratio of the network.

Further, in the above embodiment, the shared network configuration information further includes a priority value of each shared network; The selection module 120 is further configured to: when it is determined that the network capability of each shared network of all shared networks is consistent with each other, then determine whether the priority value of each shared network of all shared networks is consistent with each other; when it is determined that the priority value corresponding to each shared network of all shared networks is consistent with each other, then select randomly from all shared networks one shared network as the optimal shared network; and when it is determined that the priority value corresponding to each shared network of all shared networks is not consistent with each other, then select from all shared networks a shared network having a highest priority value as the optimal shared network.

The random selection method of selecting randomly from all shared networks one shared network according to the embodiment can be an arbitrary selection, and it can also use a pseudo-random algorithm, wherein using a pseudo-random algorithm is intended to ensure even distribution of all network users when capabilities, utilization rates and coverages of all shared networks are equivalent. The priority value of the shared network is a impact factor used to measure the shared network when capabilities of all shared networks are equivalent but coverages and resource utilization rates of all shared networks are different. When capabilities of all shared networks are same but the priority values are different, the selection of a shared network having a highest priority value can play a part in balancing network loads.

Figure 6:
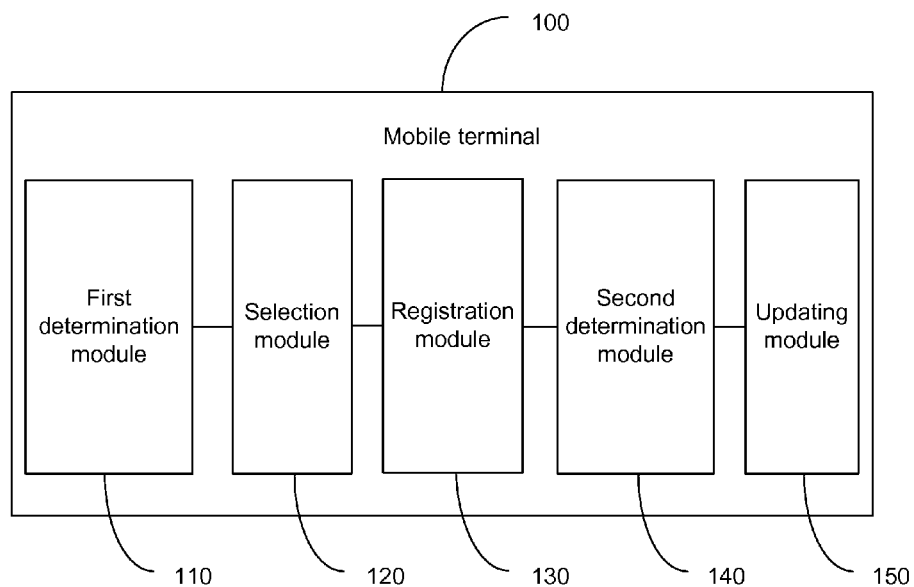
FIG. 6 is a schematic structural diagram of another embodiment of the mobile terminal according to the disclosure.

Referring to FIG. 6, provided is yet another embodiment of the mobile terminal 100 according to the disclosure, compared with the above embodiment, this embodiment further includes a second determination module 140 and an updating module 150. the second determination module 140 is configured to determine whether a current network capability of the optimal shared network is consistent with network capability information of a corresponding shared network in the shared network configuration information; the updating module 150 is configured to: when it is determined that the current network capability of the optimal shared network is not consistent with the network capability of the corresponding shared network in the shared network configuration information, then update the network capability of the corresponding shared network in the shared network configuration information so that it is consistent with the current network capability of the optimal shared network.

In the embodiment, the current network capability information of the optimal shared network is updated in the shared network configuration information so as to facilitate other mobile terminals to select a shared network.

In the embodiment of the above mobile terminal 100, after it is determined that a home network of a local SIM card is a shared network, by using the method of selecting from all shared networks an optimal shared network on which a register access operation is performed, a user of a mobile terminal is enabled to select and access the optimal shared network in a shared network environment in the case that the network side is not modified, thus the objective of balancing network loads can be achieved, thereby improving user experiences of the mobile terminal.

It should be appreciated that what described are merely preferable embodiments of the disclosure, and are not intended to limit the scope of protection of the disclosure. All equivalent structures and flow changes made using the specification and accompanying drawings of the disclosure, or direct or indirect applications of the disclosure to other related technical fields should be included within the scope of protection of the disclosure.

The invention claimed is:

1. A method for a mobile terminal to select a network, comprising:
   acquiring shared network configuration information set in advance and determining, according to the shared network configuration information, whether a home network of a local SIM card is a shared network;
   when the home network of the local SIM card is a shared network, then selecting, from all shared networks, an optimal shared network and implementing a registration operation of the optimal shared network;
   wherein the shared network configuration information comprises: an identity (ID) of each shared network and network capability information of each shared network;
   wherein network capability of a shared network is a maximum capability which the shared network supports, and the network capability of the shared network is indicated by an integer, wherein the greater the value of the integer is, the stronger the network capability is, and the higher a theoretical download rate it supports;
   wherein the network capability comprises: High Speed Downlink Packet Access (HSDPA), High Speed Uplink Packet Access (HSUPA), High Speed Packet Access Plus (HSPA+), Dual Carrier High Speed Packet Access Plus (DC-HSPA+) and Long Term Evolution (LTE);
   wherein the step of selecting from all shared networks an optimal shared network comprises:
   determining whether a network capability of each shared network of all shared network is consistent with each other;
   when it is determined that the network capability of each shared network of all shared networks is not consistent with each other, then selecting from all shared networks a shared network having a strongest network capability as the optimal shared network.

2. The method according to claim 1, wherein the shared network configuration information further comprises a priority value of each shared network;
   after it is determined whether a network capability of each shared network of all shared network is consistent with each other, the method further comprises:
   when it is determined that the network capability of each shared network of all shared networks is consistent with each other, then further determining whether the priority value of each shared network of all shared networks is consistent with each other;
   when it is determined that the priority value corresponding to each shared network of all shared networks is consistent with each other, then selecting randomly from all shared networks one shared network as the optimal shared network;
   when it is determined that the priority value corresponding to each shared network of all shared networks is not consistent with each other, then selecting from all shared networks a shared network having a highest priority value as the optimal shared network.

3. The method according to claim 1, further comprising, after the implementing a registration operation of the optimal shared network,
   determining whether a current network capability of the optimal shared network is consistent with network capability information of a corresponding shared network in the shared network configuration information;
   when it is determined that the current network capability of the optimal shared network is not consistent with the network capability information of the corresponding shared network in the shared network configuration information, then updating the network capability information of the corresponding shared network in the shared network configuration information so that it is consistent with the current network capability of the optimal shared network.

4. The method according to claim 2, wherein a priority value of a shared network is an impact factor used to measure the shared network when network capabilities of all shared networks are equivalent but coverage and resource utilization rates of all shared networks are different.

5. A mobile terminal, comprising a first determination module and a selection module, wherein
   the first determination module is configured to acquire shared network configuration information set in advance and determine, according to the shared network configuration information, whether a home network of a local SIM card is a shared network;
   the selection module is configured to: when the home network of the local SIM card is a shared network, then select from all shared networks an optimal shared network and implementing a registration operation of the optimal shared network;

wherein the shared network configuration information comprises: an identity of each shared network and network capability information of each shared network;

wherein network capability of a shared network is a maximum capability which the shared network supports, and the network capability of the shared network is indicated by an integer, wherein the greater the value of the integer is, the stronger the network capability is, and the higher a theoretical download rate it supports; wherein the network capability comprises: High Speed Downlink Packet Access (HSDPA), High Speed Uplink Packet Access (HSUPA), High Speed Packet Access Plus (HSPA+), Dual Carrier High Speed Packet Access Plus (DC-HSPA+) and Long Term Evolution (LTE);

the selection module is further configured to: determine whether a network capability of each shared network of all shared network is consistent with each other; and when it is determined that the network capability of each shared network of all shared networks is not consistent with each other, then select from all shared networks a shared network having a strongest network capability as the optimal shared network.

6. The mobile terminal according to claim 5, wherein the shared network configuration information further comprises a priority value of each shared network;

the selection module is further configured to: when it is determined that the network capability of each shared network of all shared networks is consistent with each other, then further determine whether the priority value of each shared network of all shared networks is consistent with each other; when it is determined that the priority value corresponding to each shared network of all shared networks is consistent with each other, then select randomly from all shared networks one shared network as the optimal shared network; when it is determined that the priority value corresponding to each shared network of all shared networks is not consistent with each other, then select from all shared networks a shared network having a highest priority value as the optimal shared network.

7. The mobile terminal according to claim 5, further comprising a second determination module and an updating module, wherein the second determination module is configured to determine whether a current network capability of the optimal shared network is consistent with network capability information of a corresponding shared network in the shared network configuration information;

the updating module is configured to: when it is determined that the current network capability of the optimal shared network is not consistent with the network capability information of the corresponding shared network in the shared network configuration information, then update the network capability information of the corresponding shared network in the shared network configuration information so that it is consistent with the current network capability of the optimal shared network.

\* \* \* \* \*